(12) United States Patent
Foegler et al.

(10) Patent No.: US 9,675,088 B2
(45) Date of Patent: Jun. 13, 2017

(54) FOOD CASING HAVING A TRANSFERABLE, EDIBLE INNER COATING

(75) Inventors: Jens Foegler, Taunusstein (DE); Herbert Gord, Ingelheim (DE); Bernd Adolf Lang, Wiesbaden (DE); Peter Wolf, Ostercappeln (DE)

(73) Assignee: Kalle GmbH, Wiesbaden (DE)

( * ) Notice: Subject to any disclaimer, the term of this patent is extended or adjusted under 35 U.S.C. 154(b) by 876 days.

(21) Appl. No.: 10/588,477

(22) PCT Filed: Feb. 4, 2005

(86) PCT No.: PCT/EP2005/001155
§ 371 (c)(1),
(2), (4) Date: Aug. 1, 2006

(87) PCT Pub. No.: WO2005/074691
PCT Pub. Date: Aug. 18, 2005

(65) Prior Publication Data
US 2007/0154601 A1    Jul. 5, 2007

(30) Foreign Application Priority Data
Feb. 7, 2004    (DE) ................ 10 2004 006 134

(51) Int. Cl.
*A22C 13/00*    (2006.01)

(52) U.S. Cl.
CPC .......... *A22C 13/0013* (2013.01); *A22C 13/00* (2013.01); *A22C 2013/0046* (2013.01); *A22C 2013/0053* (2013.01)

(58) Field of Classification Search
CPC .... A22C 2013/0046; A22C 2013/0053; A22C 13/00; A22C 13/13
USPC ............ 428/34.8, 36.91, 34.3; 426/105, 106, 426/135, 138, 534; 206/802; 138/113.1
See application file for complete search history.

(56) References Cited

U.S. PATENT DOCUMENTS

| | | | | |
|---|---|---|---|---|
| 3,383,223 | A * | 5/1968 | Rose | 426/420 |
| 3,695,904 | A | 10/1972 | Coleman | |
| 4,927,689 | A * | 5/1990 | Markiewicz | 428/34.8 |
| 4,985,260 | A * | 1/1991 | Niaura et al. | 426/87 |
| 5,085,890 | A * | 2/1992 | Niaura et al. | 427/149 |
| 5,413,148 | A * | 5/1995 | Mintz et al. | 138/118.1 |
| 5,620,757 | A * | 4/1997 | Ninomiya et al. | 428/34.8 |
| 5,705,214 | A * | 1/1998 | Ito et al. | 426/135 |
| 5,992,345 | A * | 11/1999 | Lange et al. | 118/13 |
| 6,143,344 | A | 11/2000 | Joh et al. | |
| 7,183,006 | B2 * | 2/2007 | Bamore et al. | 428/474.7 |
| 2001/0008658 | A1 * | 7/2001 | Barmore et al. | 428/34.3 |
| 2003/0031765 | A1 * | 2/2003 | Luthra et al. | 426/129 |

FOREIGN PATENT DOCUMENTS

| | | |
|---|---|---|
| DE | 195 00 470 A1 | 7/1996 |
| DE | 102 17 132 A1 | 10/2004 |
| DE | 103 14 669 A1 | 10/2004 |
| EP | 0 408 164 A2 | 1/1991 |
| EP | 0 986 957 A1 | 3/2000 |
| EP | 0 992 194 A1 | 4/2000 |

OTHER PUBLICATIONS

"Wet-Laid Nonwovens" Updated, Apr. 2004—Atul Dahiya, M. G. Kamath, Raghavendra R. Hegde (Haoming Rong & Ramaiah Kotra), http://www.engr.utk.edu/mse/Textiles/Wet%20Laid%20Nonwovens.htm.*

* cited by examiner

*Primary Examiner* — Lee E Sanderson
(74) *Attorney, Agent, or Firm* — ProPat, L.L.C.

(57) ABSTRACT

The invention relates to a foodstuff casing having a textile supporting layer. The textile supporting layer has, on the side facing the foodstuff, an edible, however, essentially water-insoluble coating. The coating contains solid and/or liquid aromatic substances, dyestuffs and/or food flavorings and can be transferred onto foodstuff located inside the casing. An additional layer, largely or completely formed from water soluble material may be advantageously located between the transferable layer and the textile supporting material.

24 Claims, No Drawings

FOOD CASING HAVING A TRANSFERABLE, EDIBLE INNER COATING

CROSS-REFERENCE TO RELATED APPLICATIONS

This application is being filed under Rule 1.371 as a National Stage Application of pending International Application No. PCT/EP2005/001155, which claims priority to the following parent application: German Patent Application No. 10 2004 006 134.3, filed Feb. 7, 2004. Both International Application No. PCT/EP2005/001155 and German Patent Application No. 10 2004 006 134.3 are hereby incorporated by reference herein in their entirety.

FIELD OF THE INVENTION

The present invention relates to a food casing which, on the side facing the foodstuff, has a transferable layer, and also to a method for producing it. The invention further relates to its use as artificial sausage casing.

BACKGROUND OF THE INVENTION

Means by which the optical and flavor impression of a sausage may be modified have long included immersion into corresponding baths and the application of spices, in particular pepper. They are generally carried out manually and are correspondingly complex. There has therefore been no lack of attempts to develop casings which can transfer a dye, aroma substance or flavoring to a foodstuff situated therein. This is intended to proceed, in particular, on heating, scalding or cooking the food.

For instance, EP-A0 986 957 discloses a casing for sausage or poultry meat having a support film based on polyolefin, polyamide, polyester, polyvinylidene chloride, polyvinyl chloride or polystyrene, the casing having on the inside a coating having a transferable flavoring, for example a liquid grilled chicken aroma. The flavoring is mixed in this case with a binder, such as alginate, methylcellulose, carboxymethylcellulose, hydroxypropylmethylstarch, chitosan, globulin, pectin, carageenan, casein, soy protein or wheat protein. The binder is preferably further crosslinked with a crosslinker, such as glyoxal, glutaraldehyde, melamineformaldehyde or trimethylolmelamine. Between the support film made of the thermoplastic polymer and the flavoring-containing layer, a further non-water-soluble layer can be situated. It can contain polysaccharide and/or protein. This further layer can also be arranged as covering layer on the layer having the flavoring. When the sausage is heated, solely the flavoring is transferred to the foodstuff, if appropriate through the covering layer. For a transfer of solid flavorings, for example of pepper (ground, in pieces or in the form of whole peppercorns), the casing described in the EP-A is not usable.

EP-A 0 992 194 finally discloses a barrier casing for foodstuffs which are scalded or cooked in the casing. The casing comprises a water vapor barrier and gas-tight film and an absorbent inner layer firmly attached thereto which is impregnated with dyes and/or aroma substances. Suitable materials for the inner layer are, in particular, woven fabric, knitted fabric or nonwovens made of cotton, cellulose or viscose fibers. The inner layer can be laminated or glued on. As dye or aroma substance, liquid smoke is preferred. Solid aroma substances or flavorings, such as pepper, cannot be transferred to a foodstuff situated in the casing by this casing either.

Using the sausage casing described in DE 195 00 470 A1, pepper may also be transferred. The casing is provided on the inside with an adhesive layer solidifying from the liquid state onto which spice particles are centrifuged while the adhesive layer is still adhesive. Excess particles are removed again, for example by a vigorous air stream. The casing itself generally comprises a textile material, in particular a woven cotton fabric. The method can be controlled in such a manner that the spice particles are not entirely incorporated into the adhesive layer. When the casing is taken off from the ripened sausage, they then for the most part remain on or in the sausage surface. This is particularly important in cases where the adhesive layer is not intended to become an edible part of the sausage. However, for the adhesive layer, use can also be made of substances which, after the sausage casing has been taken off, remain in whole or in part on the sausage. The adhesive layer then comprises, for example, a protein or an alginate. This casing has the disadvantage that the sausage meat emulsion very readily pushes together the spice particles on stuffing the casing. When the casing has been taken off, an uneven coating with pepper particles may then be observed. Only solid spice particles can be transferred by the casing. Liquid flavoring and/or aroma substances, such as paprika extract or liquid smoke, cannot be transferred simultaneously. A further disadvantage is that the amount of spice particles per unit area cannot be determined in advance exactly.

DE 103 14 699, which was unpublished at the priority date of the present application, relates to a textile casing which stores the dyes, aroma substances and/or flavorings directly and can release them to a foodstuff situated therein. The amount of spice to be transferred cannot be controlled exactly by this casing, since fractions can remain in the casing itself.

SUMMARY OF ADVANTAGEOUS EMBODIMENTS OF THE INVENTION

The object therefore was still to develop a food casing which transfers liquid and/or solid dyes, aroma substances and/or flavorings uniformly to a foodstuff situated in the casing, so that an additional surface treatment can be avoided. The casing, in addition, is intended to be simple and inexpensive to produce.

DETAILED DESCRIPTION OF ADVANTAGEOUS EMBODIMENTS OF THE INVENTION

The object has been achieved by an inner coating made of edible material which contains solid and/or liquid aroma substances, dyes and/or flavorings and is transferable onto a foodstuff located in the casing.

The present invention accordingly relates to a food casing having a textile support layer which, on the side facing the foodstuff, has a coating, wherein the coating is edible but is essentially water-insoluble and has a closed surface, contains solid and/or liquid aroma substances, dyes and/or flavorings and is transferable onto a foodstuff located in the casing.

The coating has at least one edible binder which adheres to the textile support material less strongly than to a proteinaceous foodstuff, such as sausage meat emulsion, to be introduced into the casing in a subsequent operation. This ensures in this manner that the coating is transferred completely and without damage. Detaching the coating from the textile support material and binding it to the foodstuff is generally performed particularly rapidly during the heating of the foodstuff in the casing, for example during scalding or cooking the sausage.

Suitable edible binders having adhesion properties are, in particular, proteins of plant or animal origin (such as casein, zein, wheat protein, soy protein, albumin, gelatin or collagen, gelatin and collagen being particularly preferred), polysaccharides (especially alginate, carageenan, glucomannan, methylcellulose, starch or hydroxypropylstarch) and also any desired combinations thereof. Proteins have in this case the particular advantage that they bind particularly readily and relatively firmly to sausage meat emulsion and thus effect a smooth transfer of the coating to the foodstuff. The inner coating therefore preferably comprises at least one protein. The transferable layer is not water-soluble, or is only slightly water-soluble, i.e. it remains essentially intact even after the action of moisture. This may be achieved, for example using crosslinkers, for example dialdehydes (such as glyoxal or glutaraldehyde) or citrate, by treatment with smoke and/or by warming or heating.

The solid or liquid aroma substance, dye and/or flavoring is preferably pepper (finely ground, in pieces or in whole corns), curry spice, paprika aroma, dry smoke, liquid smoke, liquid grill aroma, herbs (such as oregano, dill or basil), (freeze-)dried and comminuted vegetables (asparagus granules, broccoli or sweet potatoes), ground nuts (such as pine kernels), grains (sesame or pumpkin seed), cheese particles, air-dried honey, caramel, cinnamon, marinades of all types, dextrose, if appropriate also enzymes and microorganisms which produce enzymes promoting digestion.

In a preferred embodiment, between the transferable layer of edible material and the textile support material, there is a further relatively thin layer which, in contrast to the transferable layer, comprises water-soluble material. In the finished packaged foodstuff, that is to say particularly in the finished sausage, this layer is partially dissolved or dissolved by the moisture present in the foodstuff, so that the transferable layer loses its anchoring. Suitable compounds for the thin additional layer are in principle all compounds which are considered safe for food use, in particular the proteins and polysaccharides mentioned in connection with the transferable layer provided that these are sufficiently soluble. "Soluble" in this context means that the layer substantially dissolves under the action of moisture which is supplied from the outside (e.g. on scalding with steam) and/or originates from the foodstuff itself, and is no longer recognizable as an independent layer.

This embodiment is particularly expedient in the case of coarse-grained or piece-form aroma substances, dyes and/or flavorings, such as whole peppercorns or coarsely ground pepper. The peppercorns, pieces or the like are then applied to the layer of at least partially water-soluble edible binders having adhesion properties. Subsequently, a sufficient amount of the edible binder(s) having adhesion properties is applied and crosslinked so that a surface is formed that is so smooth that peppercorns or similar particles are not pushed together on stuffing the casing or torn from the overall layer. In this manner, for example, a sausage may be obtained which, after the textile support material is taken off, is coated without gaps and uniformly by peppercorns. The binder layer applied first is expediently selected to be so thin that it, after the support material is taken off, virtually does not disturb the optical impression.

The inventive casing has the particular advantage that solid and liquid aroma substances, dyes and/or flavorings can be transferred simultaneously. For example, a liquid paprika aroma can be combined with peppercorns or pepper pieces. Here, a mixture of the aroma substances, dyes and/or flavorings can be applied in each case. Equally, the aroma substances, dyes and/or flavorings can also be applied first. Then, a continuous layer of the insoluble, or only slightly soluble, edible binders is applied thereto.

The textile support material is preferably a woven fabric, knitted fabric, consolidated nonwoven, spunbonded nonwoven or fiber paper. These are produced, in particular, from natural fibers such as cotton or cellulose fibers (e.g. linen), wool or silk. However, artificial fibers may also be used, for example fibers based on polyamide, polyester, polyolefin (in particular polypropylene), regenerated cellulose (=viscose staple fiber), polyvinyl acetate, polyacrylonitrile, polyvinylidene chloride (PVDC) or polyvinyl chloride (PVC). Mixtures of different fibers, e.g. mixtures of cotton and polyester, are likewise usable. The thickness or weight per unit area of the textile support material depends on the later use. Generally, it is 3 to 1000 $g/m^2$, preferably 10 to 200 $g/m^2$, particularly preferably 20 to 130 $g/m^2$. The textile support material is extensible or inextensible, in accordance with the respective requirements. An inextensible support material is expedient for constant-caliber sausage casings.

In addition to the transferable coating on the inside which is suitable for co-consumption, the support material can have a non-edible and non-transferable coating on the outside and/or the inside. By appropriate selection of type and thickness of the coating, the water vapor, smoke and/or oxygen permeability of the casing can be set to a desired value. For instance the coating can comprise, for example, polyacrylate, polyvinyl acetate, PVDC, polyurethane or similar thermoplastic polymers or polymer mixtures.

A plurality of coatings of identical or different composition can also be applied on the outside and/or inside. A coating of regenerated cellulose is also suitable, in particular in combination with a fiber paper support material.

The inventive food casing is preferably tubular. It is expediently produced from a flat textile material which if appropriate is provided with one or more of the above-described non-transferable coating(s). Onto the side which later forms the inside, a mixture is then applied which comprises at least one edible binder having adhesion properties and at least one aroma substance, dye and/or flavoring. In addition, the coating mixture expediently contains water, if appropriate also an edible plasticizer such as glycerol, and/or a crosslinker, such as citrate (in particular Na citrate or triethyl citrate). The application itself is performed, for example, by a single or multiple doctor blade application. The closed surface of the transferable layer is preferably smooth enough so that the sausage meat emulsion can slide thereover without any problems on stuffing. After drying, the coated flat material is cut into webs, the webs are each brought into a tubular form and the longitudinal edges of the webs permanently join together, for example by sewing, gluing or sealing. Equally successfully, the longitudinal edges can also be permanently joined using sealing strips or glue strips which comprise, for example, a reactive glue.

The inventive food casing is used especially as artificial sausage casing.

The examples hereinafter serve to illustrate the invention. Percentages therein are percentages by weight unless stated otherwise or clear from the context.

EXAMPLE 1

A flat support material made of 100% polyamide woven fabric having a weight per unit area of 17 $g/m^2$ was coated with a mixture of gelatin and curry spice. After drying, the total weight of support material and coating was about 50 g/m², i.e. the coating had a weight of 33 g/m². The coated woven fabric was cut into webs and each web was sewed to make a tube in such a manner that the coated side was located on the inside.

The casing was stuffed with sausage meat emulsion, the stuffed casing was scalded and then cooled. Subsequently the casing was taken off. It was found that the coating had bonded to the sausage meat emulsion and had transferred to this. The surface of the sausage was accordingly colored yellow by the curry spice and had taken on the odor and flavor of curry.

EXAMPLE 2

A flat support material made of a mixture of cotton and polyester having a weight of 58 g/m² was coated on the later outside first with an acrylate dispersion, then with PVDC. On the later inside, a gelatin layer was then applied into which the paprika spice had been mixed. After drying, the casing had a total weight of about 150 g/m². The coated flat material was then, as described in example 1, cut to form webs and the webs were formed into tubular casings, the longitudinal edges of the individual webs being sewed together.

The tubular casings were stuffed with sausage meat emulsion and scalded. After cooling the sausage, the casing could be taken off without any problems, the gelatin coating having the paprika spice remaining virtually completely on the sausage meat emulsion. The surface of the sausage had taken on the red paprika color and the corresponding color and odor of paprika spice. As a result of the outer coating, the sausage, after scalding, exhibited only a very low weight loss.

EXAMPLE 3

A flat support material made of 100% polyamide knitted fabric having a weight per unit area of 21 g/m² was coated with a water-soluble collagen material. Peppercorns were applied onto this layer, subsequently the support material was coated with a water-insoluble layer of collagen and dried. The final weight was 80 g/m². The coated support material was sewn to form a tube in such a manner that the coated side was on the inside. The casing was stuffed with sausage meat emulsion, the stuffed casing was cooked and thereafter cooled. Subsequently the casing was taken off. It was found that the coating had bonded to the sausage meat emulsion and had transferred to this. The surface of the sausage was coated without gaps and uniformly with peppercorns. The water-soluble layer first applied was virtually no longer recognizable on the sausage.

The invention claimed is:

1. A food casing comprising (a) a textile support layer consisting of a woven fabric or knit fabric and (b) a single-layered transfer coating adhering to the textile support layer, wherein the coating (i) is essentially water-insoluble, (ii) has a closed surface, (iii) comprises a mixture of at least one edible binder that has been mixed with solid aroma substances and/or liquid aroma substances, dyes and/or flavorings that does not include plasticizer and (iv) is transferred completely onto a foodstuff located in the casing, the edible binder is gelatin or collagen and the transfer coating further comprises a crosslinker, citrate, smoke treatment or has been heated to impart water insolubility, and said casing is a constant-caliber sausage casing.

2. The food casing as claimed in claim 1, wherein the coating comprises (i) at least one edible binder; (ii) solid aroma substances and/or liquid aroma substances, dyes and/or flavorings and (iii) optional crosslinker, citrate or smoke treatment and the edible binder adheres to the textile support material less strongly than to a proteinaceous foodstuff.

3. The food casing as claimed in claim 2, wherein the edible binder is a protein of plant or animal origin, a polysaccharide, or a combination thereof.

4. The food casing as claimed in claim 1, wherein the solid or liquid aroma substance, dye and/or flavoring comprises pepper, curry spice, paprika aroma, dried smoke, liquid smoke, liquid grill aroma, herbs, (freeze-)dried and comminuted vegetables, ground nuts, grains, cheese particles, air-dried honey, caramel, cinnamon, marinades, dextrose, or enzymes or microorganisms which produce enzymes promoting digestion.

5. The food casing as claimed in claim 1, wherein the textile support material comprises natural fibers, artificial fibers, or mixtures thereof.

6. The food casing as claimed in claim 5, wherein the natural fibers are selected from cotton, cellulose fibers, wool, silk or mixtures thereof.

7. The food casing as claimed in claim 5, wherein the artificial fibers are selected from fibers based on polyamide, polyester, polyolefin, regenerated cellulose, polyvinyl acetate, polyacrylonitrile, polyvinylidene chloride, polyvinyl chloride or mixtures thereof.

8. The food casing as claimed in claim 1, wherein, the textile support layer further comprises at least one non-edible, non-transferable coating.

9. The food casing as claimed in claim 8, wherein the non-edible, non-transferable coating decreases the food casing permeability to water vapor, smoke or oxygen.

10. The food casing as claimed in claim 1, wherein the food casing is tubular and optionally has a longitudinal seam.

11. The food casing as claimed in claim 10, wherein the food casing has a longitudinal seam and the longitudinal seam is a sewed, glued or sealed seam, or it is produced using a sealing strip or adhesive strip.

12. An artificial sausage casing comprising the food casing as claimed in claim 1.

13. The food casing as claimed in claim 1, wherein the edible binder consists of gelatin.

14. A food casing as claimed in claim 1, wherein a layer made of a water-soluble material is arranged between the textile support layer and the transferable edible coating, and the transferable edible coating is crosslinked to impart a smooth coating surface, thereby producing a uniform coating without gaps on the foodstuff.

15. A food casing as claimed in claim 1, wherein the coating is rendered not water-soluble via treatment with smoke and/or by warming or heating.

16. The food casing as claimed in claim 1, wherein the transfer coating has a smooth surface so that sausage meat emulsion can slide thereover during stuffing.

17. A food casing as claimed in claim 1, wherein said casing does not comprise a film based on polyolefin, polyamide, polyester, polyvinylidene chloride, polyvinyl chloride or polystyrene.

18. A food casing comprising a textile support layer consisting of a woven fabric or knit fabric and an edible coating anchored thereto, wherein the edible coating (i) is essentially water-insoluble via an insolubilization consisting of adding a citrate crosslinker, smoke treatment, warming and/or heating, (ii) has a closed surface, (iii) comprises at least one edible binder and solid aroma substances and/or liquid aroma substances, dyes and/or flavorings, and (iv) is transferable onto a foodstuff located in the casing, wherein the solid or liquid aroma substance, dye and/or flavoring comprises pepper, curry spice, paprika aroma, dried smoke, liquid smoke, liquid grill aroma, herbs, freeze-dried and comminuted vegetables, ground nuts, grains, cheese particles, air-dried honey, caramel, cinnamon, marinades, dextrose, or enzymes or microorganisms which produce enzymes promoting digestion and a layer comprising water-soluble material is arranged between the textile support layer and the transferable edible coating so that the transferable coating loses its anchoring under the action of moisture, and the casing is a constant-caliber sausage casing.

19. A food casing as claimed in claim 18, wherein the transferable edible coating is crosslinked.

20. A food casing comprising a textile support layer consisting of a woven fabric or knit fabric directly coated with a single-layered transfer coating adhering to the textile support layer, wherein the coating (i) is essentially water-insoluble, (ii) has a closed surface, (iii) comprises a mixture of at least one edible binder that has been mixed with solid aroma substances and/or liquid aroma substances, dyes and/or flavorings and (iv) is transferred completely onto a foodstuff located in the casing, wherein the edible binder is gelatin or collagen and the transfer coating further comprises a crosslinker, citrate, smoke treatment or has been heated to impart water insolubility and said casing is a formed tubular shape with permanently bonded longitudinal edges.

21. A method for producing a food casing as claimed in claim 1, said method comprising the following steps in the given sequence:

providing a flat textile material, applying to the side which later faces a foodstuff an edible coating made of a mixture which comprises at least one edible binder having adhesion properties and at least one aroma substance, dye and/or flavoring and optional crosslinker, citrate or smoke treatment, drying the coating, optionally cutting the coated flat material into webs, forming the individual webs into a tubular shape and permanently bonding the longitudinal edges of the formed tubular shape.

22. The method as claimed in claim 21, wherein the mixture which contains at least one edible binder having adhesion properties and at least one aroma substance, dye and/or flavoring is an aqueous mixture.

23. The method as claimed in claim 21, wherein, before the edible coating is applied, at least one barrier layer is applied.

24. The method as claimed in claim 21, wherein the permanently bonding step comprises sewing or gluing.

* * * * *